United States Patent [19]

Brownback et al.

[11] 4,096,534

[45] Jun. 20, 1978

[54] TRACK ACCESSING CIRCUITRY FOR A DISK FILE WITH SWITCHABLE FILTER

[75] Inventors: Dewey Earl Brownback; Calvin Shizuo Nomura; Dennis Patrick Sheehan; Michael M. Siverling, all of Rochester, Minn.

[73] Assignee: International Business Machines Corporation, Armonk, N.Y.

[21] Appl. No.: 786,917

[22] Filed: Apr. 12, 1977

[51] Int. Cl.$^2$ .......................... G11B 21/08; G11B 5/55
[52] U.S. Cl. ...................................................... 360/78
[58] Field of Search ........................................... 360/78

[56] References Cited

U.S. PATENT DOCUMENTS

| | | | |
|---|---|---|---|
| 3,122,687 | 2/1964 | Romvari | 360/77 |
| 3,209,338 | 9/1965 | Romvari | 360/78 |
| 3,399,391 | 8/1968 | Barrosse | 360/77 |
| 3,691,543 | 9/1972 | Mueller | 360/77 |
| 3,696,354 | 10/1972 | Palumbo et al. | 360/78 |
| 3,699,555 | 10/1972 | Duvall | 360/78 |
| 3,789,378 | 1/1974 | Bonzano et al. | 360/77 |
| 3,820,712 | 6/1974 | Oswald | 235/151.32 |
| 3,821,804 | 6/1974 | Stevenson et al. | 360/78 |
| 3,936,876 | 2/1976 | Taylor | 360/78 |

OTHER PUBLICATIONS

IBM Tech. Disc. Bull., vol. 16, No. 12, 5/74, pp. 4064–4065.
IBM Tech. Disc. Bull., vol. 17, No. 5, 10/74, pp. 1468–1469.

*Primary Examiner*—Robert S. Tupper
*Attorney, Agent, or Firm*—Keith T. Bleuer

[57] ABSTRACT

Circuitry for providing a high speed access by a swingable arm and a transducer carried thereby across a plurality of tracks on a rotatable data storage device to a target track on the rotatable device including a speed indicating circuit connected with the transducer for indicating the speed of the transducer in crossing tracks on the rotatable device and a switchable filter effectively between the transducer and said speed indicating circuit which has a high roll off as the transducer crosses the tracks at a high speed and has a low roll off as the transducer approaches the target track at a relatively low speed so as to thereby cause the speed indicating circuit to accurately indicate the speed of the transducer in moving across the tracks of the rotatable device.

13 Claims, 7 Drawing Figures

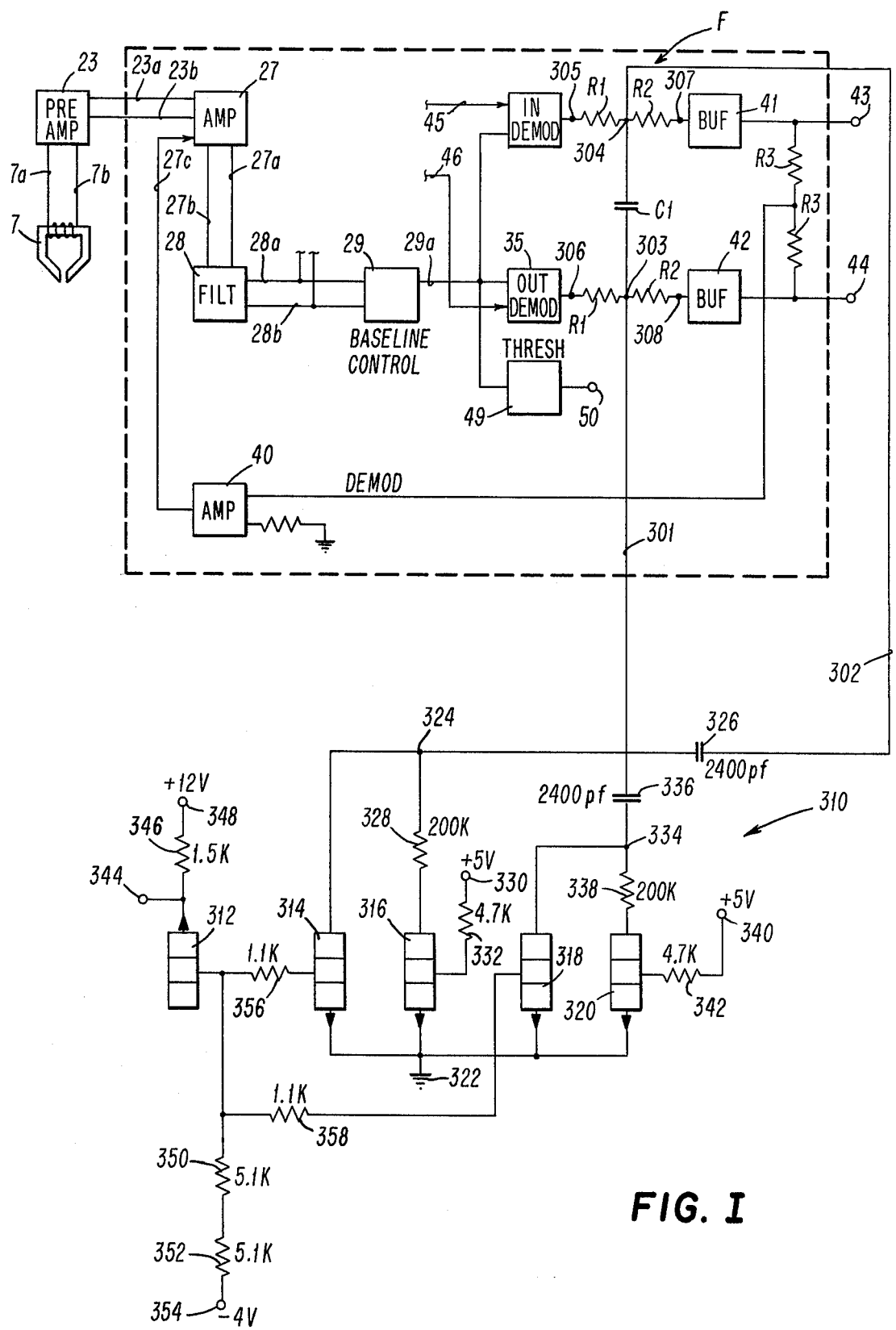
FIG. I

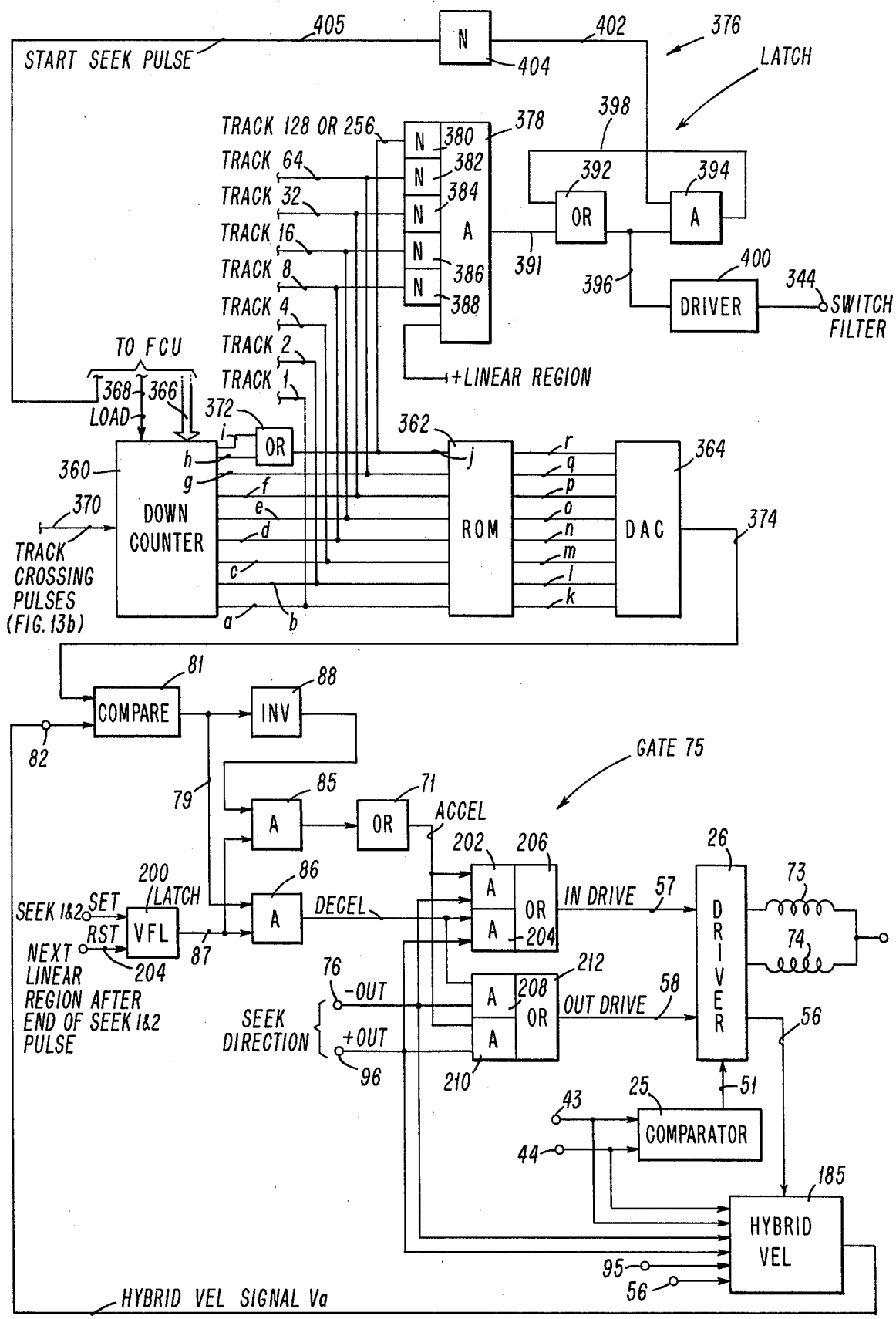
FIG. II

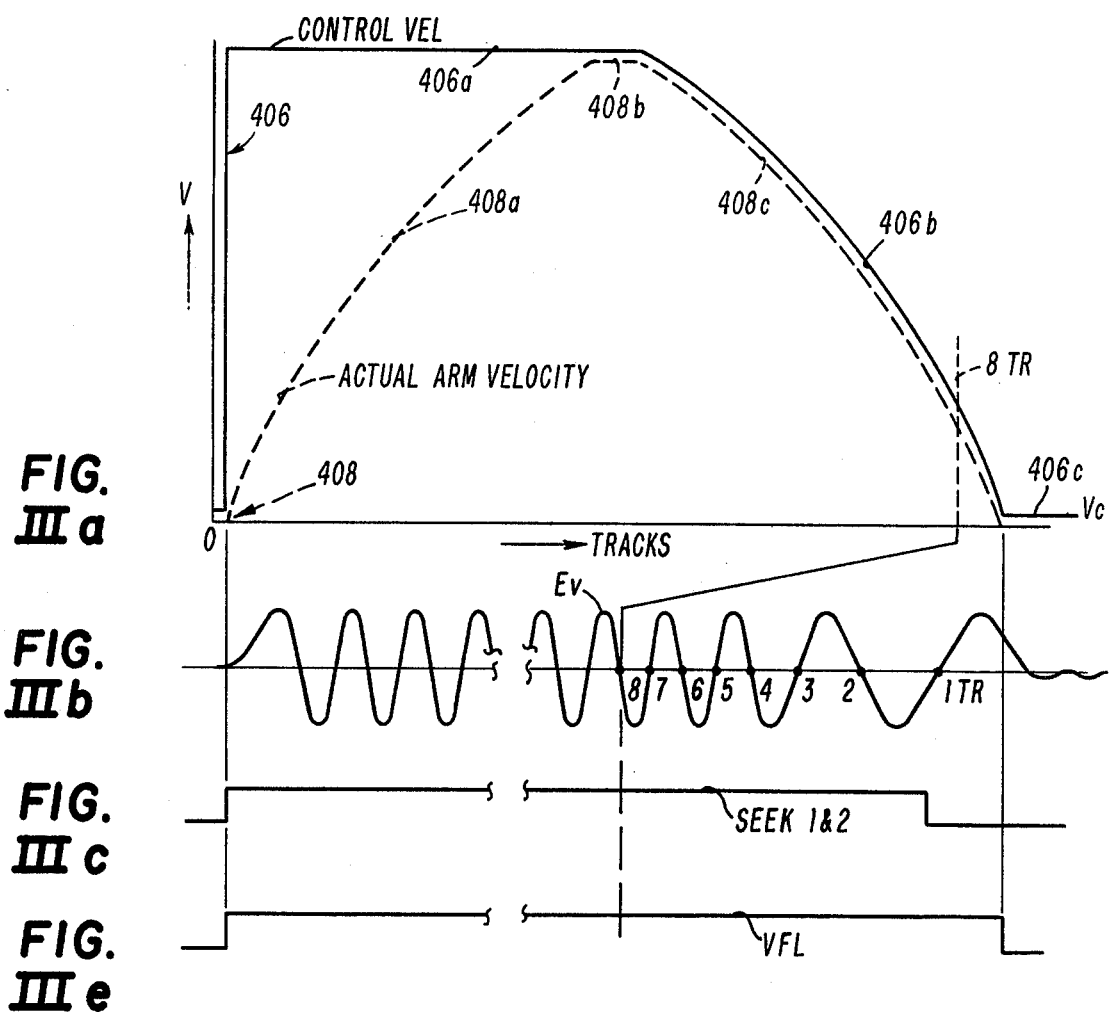
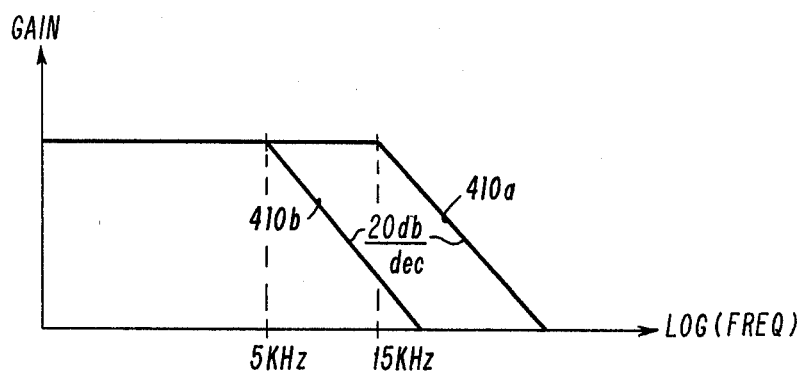
FIG. IV

TRACK ACCESSING CIRCUITRY FOR A DISK FILE WITH SWITCHABLE FILTER

CROSS-REFERENCE TO RELATED PATENT

The invention of this application constitutes improvements on the mechanisms and circuitries disclosed in U.S. Pat. No. 3,936,876, issued Feb. 3, 1976 to John R. Taylor on "Rotatable Data Storage Apparatus With Track Selection Actuator Having Multiple Velocities".

BACKGROUND OF THE INVENTION

The invention relates to rotatable data storage devices and more particularly to magnetic disk files having rotatable magnetic disks across which transducers are moved for the purpose of reading from and writing on the disks and for the purpose of determining the particular magnetic tracks on the disks on which the transducers are located.

It has been previously proposed in said John R. Taylor U.S. Pat. No. 3,936,876 that a velocity circuit be actuated by a position error signal (which has a zero crossing for each track crossing) derived from a servo transducer moving across the tracks of a magnetic disk, with the velocity circuit cooperating with other circuitry so as to bring the transducer accurately to a target track on the disk in a track crossing access operation. The John R. Taylor circuits include a filter which has a relatively low roll off so that undue noise is not transmitted to the velocity circuit which has a differentiator therein that would otherwise provide erroneous velocity signals.

The John R. Taylor circuitry has proved to be very satisfactory for transducer velocities quite acceptable to the present time. The Taylor circuitry was designed for a maximum transducer velocity of 1320 tracks per second, and it was also satisfactory for a subsequent maximum transducer velocity of 2381 tracks per second. However, when the transducer speed was increased to 7143 tracks per second, it was found that changes were necessary.

At the latest maximum transducer speed of 7143 tracks per second, it has been found that the roll off of the Taylor filter should be increased so that a non-degraded position error signal be transmitted to the velocity circuit and so that the velocity circuit may accurately indicate the transducer velocities at these high velocities during a track access. As the transducer slows, however, in approaching its target track, the velocity circuit has been found to provide erroneous velocity indications, this being due to considerable noise transmitted through the relatively high roll off filter and differentiated by the differentiator. For high speeds of the transducer across the disk, the signal to noise ratio of the output of the differentiator is high; however when the transducer slows in reaching its target track, this signal to noise ratio is low since the gain of the differentiator is proportional to frequency, causing erroneous velocity indications by the velocity circuit and particularly by its differentiator. The noise is considered to be due to defects in the disk, resonances in the circuitry and in the mechanical supporting structure for the transducer and variations in spacing between the head and the disk as the disk rotates (the transducer flies at a few microinches over the disk during operation).

SUMMARY OF THE INVENTION

It is an object of the present invention to provide improvements in the circuitry of said John R. Taylor U.S. Pat. No. 3,936,876 which will provide accurate indications of the velocity of the servo transducer as it crosses the disk during an access, both at high speeds of the transducer in crossing the tracks on the disk and also at low speeds of the transducer as it approaches its target track.

In its preferred form, the improved circuitry of the present invention constitutes a switchable filter effectively disposed between the transducer and the velocity circuit which provides a relatively high roll off at high speeds of the transducer in crossing the magnetic tracks and which provides a relatively low roll off when the speed of the transducer is relatively low in approaching its target track. Preferably, the speed of the transducer in crossing the tracks is determined by a pre-programmed read only memory which provides a relatively high speed of the transducer during a middle part of a track accessing operation and which provides a gradually decreasing transducer speed as the transducer moves close to its target track. Since the speed of the transducer is thus determined and gradually decreases as the transducer moves toward its target track, preferably the circuitry of the present invention switches the filter from a high roll off to a low roll off condition when the transducer is a predetermined number of tracks, such as 8, from the target track, thus in effect switching the filter when the transducer reaches a certain predetermined low speed.

BRIEF DESCRIPTION OF THE DRAWINGS

The invention herein as before mentioned constitutes improvements on the circuitry disclosed in John R. Taylor, U.S. Pat. No. 3,936,876, and hence references will be made just below to certain figures of U.S. Pat. No. 3,936,876.

FIG. I shows in block form a position detect circuit forming part of the servo position loop illustrated diagramatically in FIG. 6 of U.S. Pat. No. 3,936,876 and takes the place of FIG. 7 in U.S. Pat. No. 3,936,876.

FIG. II shows in block form a circuit for performing track access operations and takes the place of FIG. 21 in U.S. Pat. No. 3,936,876.

FIGS. IIIa to IIIe show a velocity profile, an error signal and control signals for a track access and take the place of FIGS. 14a to 14e of U.S. Pat. No. 3,936,876; and FIG. IV is a graph showing the roll off characteristics of a filter forming a part of the FIG. I circuitry under two different conditions of operation.

DESCRIPTION OF THE PREFERRED EMBODIMENT

As has been mentioned, the present invention constitutes an improvement on the Rotatable Data Storage Apparatus With Track Selection Actuator Having Multiple Velocities disclosed in U.S. Pat. No. 3,936,876; and much of the circuitry and mechanisms of the present invention are identical to those disclosed in U.S. Pat. No. 3,936,876. U.S. Pat. No. 3,936,876 therefore is incorporated by reference herein; and disclosure of the mechanisms, circuits, portions of the specification and figures of the drawings of U.S. Pat. No. 3,936,876 which are applicable to the present invention will not be repeated herein.

Basically, the differences between the present invention and that disclosed in U.S. Pat. No. 3,936,876 are the following:

1. The filter circuit including resistors R1 and R2 and capacitor C1 in FIG. 7 of U.S. Pat. No. 3,936,876 has been modified to be switchable between two different roll offs,
2. The capture store 90 and velocity store 78 shown in FIG. 21 of U.S. Pat. No. 3,936,876 which determine the velocity of the access arm 18 in a constant velocity phase and at a capture velocity are replaced in the present invention by other velocity determining circuitry, and
3. The individual Seek 1 and Seek 2 signals have been replaced by a composite "Seek 1 & 2" signal in the present invention. AND circuit 199 in FIG. 21 of U.S. Pat. No. 3,936,876 differentiating between the Seek 1 and Seek 2 signals is thus deleted herein along with its output line 70.

Therefore, the figures of the drawings in U.S. Pat. No. 3,936,876 relating to the filter circuit including the resistors R1 and R2 and the capacitor C1 and relating to the velocity store 78 and the capture store 90 and AND circuit 199 are deleted and disregarded insofar as the present invention is concerned. The figures of the drawings of U.S. Pat. No. 3,936,876 that are so disregarded with respect to the present invention are FIG. 7 (replaced by FIG. I hereof), FIG. 21 (replaced by FIG. II hereof) and FIGS. 14a, 14b, 14c, 14d and 14e (replaced by FIGS. IIIa, IIIb, IIIc and IIIe hereof). In addition, FIGS. 15a, 15b, 15d, 16a, 16b, 16c, 16d, 17a, 17b, 17c, 17d and 30 of U.S. Pat. No. 3,936,876 are disregarded with respect to the present invention. FIGS. 1-6, 8-13, 18-20, and 22-29 of U.S. Pat. No. 3,936,876 are applicable to and are descriptive of the present invention and in particular are incorporated by reference herein.

The portions of the specification of U.S. Pat. No. 3,936,876 that are limited to the cooperation of the individual Seek 1 and Seek 2 lines and to the stores 78 and 90 producing the constant velocity phase and capture velocity described in the patent are thus not applicable to the present invention.

The following modifications of the structure and operation of the mechanisms and circuitries of U.S. Pat. No. 3,936,876 in particular are noted:

1. The component values of R1, R2 and C1 are such as to give a roll off differential signal at 15KHz and above instead of 7KHz and above as stated in lines 36 and 37, column 7 of the specification of U.S. Pat. No. 3,936,876 (the filter roll off in the Taylor actual production file was 5KHz instead of 7KHz).
2. Referring to column 8, lines 49–57; column 11, lines 46–54 and column 14, lines 20 and 21, track crossing pulses as shown in FIG. 13b are still supplied to the FCU for various purposes, but during a track access, part of the FIG. II circuitry hereof in lieu of the FCU keeps a count of the number of tracks crossed as will be described hereinafter in detail.

The position detect circuit shown in FIG. I includes the servo transducer 7, the preamplifier 23, the variable gain amplifier 27, the filter 28, the baseline control circuit 29, the demodulator 34, the demodulator 35, resistors R1 and R2, capacitor C1, buffer circuits 41 and 42, resistors R3 attached to terminals 43 and 44, amplifier 40 and threshold circuit 49 attached to terminal 50. All of these components are and operate the same as the correspondingly numbered components shown and described in U.S. Pat. No. 3,936,876 with the exception that the values of R1, R2 and C1 are such as to give a filter roll off at 15KHz and above in lieu of the roll off at 7KHz and above as mentioned in lines 36 and 37 of column 7 of U.S. Pat. No. 3,936,876. Leads 301 and 302 are shown in FIG. I connected to points 303 and 304 at the ends of capacitor C1, and it is assumed that these leads 301 and 302 are open for the roll off at 15KHz and above. The filter is designated as "F" in FIG. I and is between the points 305 and 306 on one side and points 307 and 308 on the other side.

FIG. I shows an auxiliary filter circuit 310 connected by means of the leads 301 and 302 with the points 303 and 304. The auxiliary circuit 310 comprises transistors 312, 314, 316, 318 and 320. The emitters of the transistors 314, 316, 318 and 320 are connected to a ground 322. The collector of transistor 314 is connected to a point 324 which is connected through a capacitor 326 with the lead 302. The collector of transistor 316 is connected through a resistor 328 with the point 324 and thus with capacitor 326. A plus voltage source is applied to terminal 330 which is connected through a resistor 332 with the base of transistor 316.

The collector of transistor 318 is connected to a point 334 which is connected through a capacitor 336 with lead 301. The collector of transistor 320 is connected through a resistor 338 with point 334 and thus with capacitor 336. A terminal 340 has a plus voltage applied to it and is connected through a resistor 342 with the base of transistor 320.

The emitter of transistor 312 is connected with control terminal 344 for the auxiliary filter circuit 310 and is connected through a resistor 346 with a terminal 348 to which a plus voltage is applied. The base of transistor 312 is connected through resistors 350 and 352 with a terminal 354 to which a minus voltage is applied. The base of transistor 312 is also respectively connected to the bases of transistors 314 and 318 through resistors 356 and 358. The transistor 312 has only two connections to it as shown and functions as a zener diode as will be hereinafter described in more detail.

The FIG. II circuitry comprises the comparator 81, the inverter 88, AND circuits 85, 86, 202, 204, 208 and 210, OR circuits 71, 206 and 212, driver circuit 26, compensator circuit 25, coils 73 and 74, hybrid velocity circuit 185 and VFL latch 200 which are the same and operate the same as the correspondingly numbered parts in U.S. Pat. No. 3,936,876. The terminals 82, 76, 96, 43, 44, 95 and 56 have the same connections as in FIG. 21 of U.S. Pat. No. 3,936,876. The same is true of the terminals for latch 200. The other numbered parts 87, 79, 75, 51, 56, 57 and 58 have the same connections and operations as do the correspondingly numbered parts in FIG. 21 of U.S. Pat. No. 3,936,876.

The deletions that have been made in the circuitry of FIG. II as compared to that in FIG. 21 of U.S. Pat. No. 3,936,876 are the following:

1. AND circuit 199 of U.S. Pat. No. 3,936,876 has been deleted from FIG. II hereof as well as its input Seek 1 and $\overline{\text{Seek 2}}$ lines and its output line 70. This is due to the fact that the Seek 1 and Seek 2 lines have been connected together in the present invention and thus in effect constitute a single interface "Seek 1 and 2" line with the FCU.
2. The velocity store 78 and the capture store 90 of U.S. Pat. No. 3,936,876 have been deleted from the FIG. II circuitry hereof together with the terminals 84 and 89 and lead 80. The capture store 90 and velocity store 78 of U.S. Pat. No. 3,936,876 provide a desired velocity signal on line 80 to the comparator 81; and this signal is instead supplied by a down counter 360, a read only memory 362 and a digital to analog converter 364 all of which are shown in FIG. II hereof.

The down counter 360 is connected to the file control unit (FCU) by means of a nine line bus 366 and also by means of a "load" pulse lead 368 and an "on track" line 370 which constitute interface lines with the FCU. The down counter 360 has output lines $a$ to $i$, and these have signals on them when the content of the down counter 360 is respectively 1, 2, 4, 8, 16, 32, 64, 128 and 256 (tracks). An OR circuit 372 has lines $h$ and $i$ as inputs and has a single output line $j$.

The lines $a$ to $g$ and $j$ are applied as inputs to the read only memory 362 which has the output lines $k$ to $r$ applied as inputs to the digital to analog converter 364. The converter 364 has an output line 374; and, as will be hereinafter described in greater detail, the read only memory 362 is so coded that it along with the converter 364 provides a desired velocity control signal on line 374. Line 374 is applied as an input to the comparator 81.

The auxiliary filter circuit 310 shown in FIG. I is controlled by the filter control circuit 376 shown in FIG. II which is connected to the lines $a$ to $g$ and $j$ as inputs and has the terminal 344 constituting the control input of the auxiliary filter circuit 310 as an output. The circuit 376 comprises an AND circuit 378 having appended inverters 380, 382, 384, 386 and 388. A lead 390 carrying the "linear region" signal as will be described, also constitutes an input to AND circuit 378. The AND circuit 378 is connected by a lead 391 to an OR circuit 392 which in turn is connected to an AND circuit 394 by means of a lead 396. A line 398 constitutes the output of the AND circuit 394 and is connected as an input to the OR circuit 392 so that the circuits 392 and 394 constitute in effect a latch. The line 396 is connected as an input to a driver 400 which has the control terminal 344 previously mentioned as its output. The AND circuit 394 has a lead 402 as a second input, and lead 402 is connected through inverter 404 with the FCU interface line 405 carrying a "start seek pulse" signal.

In operation, the lower portion of the circuitry shown in FIG. II and including the comparator 81, inverter 88, AND circuits 85, 86, 202, 204, 208 and 210, OR circuits 71, 206 and 212, driver 26, compensator 25 and hybrid velocity circuit 185 function in the same manner as described in U.S. Pat. No. 3,936,876 for controlling the current in coils 73 and 74 during an access, the only difference being that the comparator 81 has a desired velocity signal from the converter 364 applied to it in lieu of the same type of signal derived from the capture store 90 and velocity store 78 disclosed in U.S. Pat. No. 3,936,876.

The down counter 360 is supplied with a binary signal on bus 366 from the file control unit which indicates in binary notation the number of tracks that it is desired that the arm 18 shall traverse during an access operation. After these signals have been made available on the bus 366 from the file control unit, the file control unit then issues a "load" pulse on line 368, and this causes the binary count on bus 366 to be loaded into the down counter 360. The corresponding binary count is then apparent as signals on the output lines $a$ to $i$ of the down counter 360. The count determined by the signals on lines $a$ to $i$ is indicative of the number of tracks that shall be crossed by the transducer 7 during an access operation, a signal on only the line $g$ for example indicating that there shall be a 64 track access. Correspondingly, signals on the lines $a, b, c, d, e, f, g, h,$ and $i$ indicate that there shall be corresponding accesses of 1, 2, 4, 8, 16, 32, 64, 128 and 256 tracks. Combinations of signals on the lines $a$ to $i$ will of course indicate accesses of other numbers of tracks.

With the down counter 360 containing the count of the number of tracks that shall be accessed, track crossing pulses on the "on track" line 370 (referred to in lines 20–21 of column 14 of U.S. Pat. No. 3,936,876 and shown in FIG. 13b of this patent) are applied to the down counter 360 and cause the counter 360 to count down for each of the track crossing pulses as the servo transducer 7 crosses each of the tracks. Thus the corresponding indication of the count on lines $a$ to $i$ decreases at the same time. The down counter 360 thus takes the place of the FCU in keeping track of the tracks crossed by the transducer 7.

The read only memory 362 has its content personalized such that it provides a certain output code on its output lines $k$ to $r$ for each track count applied as signals on lines $a$ to $h$ and $j$. This output code on lines $k$ to $r$ is selected such that when it is fed into the digital to analog converter 364 from the lines $k$ to $r$, the output of the converter 364 provides the control velocity curve 406 shown in FIG. IIIa. It is contemplated that preferably, for at least one application, the control velocity curve 406 shall have a constant value indicated by its portion 406a for an access of more than 64 tracks, and for this reason the OR circuit 372 has been provided for combining the signals on the lines $h$ and $i$. The read only memory 362 is preferably so preprogrammed that the descending portion 406b of the control velocity curve 406 shall be parabolic as shown in FIG. IIIa, although the read only memory 362 could as easily be programmed to reflect a different shaped curve. The read only memory 362 at the end of the access provides a capture velocity (Vc) 406c which is very close to zero velocity, so that at that point, track following phase may take place as described in the paragraph beginning in column 18, line 61 of U.S. Pat. No. 3,936,876. The deceleration part 406b of the control velocity curve 406 is so placed that a data store apparatus with worst case performance can just follow with maximum reverse power applied. Thus all other such machines operate at less than their optimal decelerate capabilities but still take no longer to decelerate than the worst case machine. Using this method, all machines are assured of reaching the correct target track.

The control velocity signal from converter 364 on line 374 which is shown by curve 406 is applied onto the comparator 81, and the comparator 81 functions in connection with the rest of the circuit derived from U.S. Pat. No. 3,936,876 and shown in FIG. II to cause the arm 18 to move as closely as possible at the same speed as indicated by this signal. The actual arm velocity is shown by curve 408 in FIG. IIIa, and the initial portion 408a of the curve indicates that the arm 18 is driven at full forward power until the flat upper portion 408b of the actual arm velocity curve 408 is reached. This is substantially the same velocity as is called for by the uppermost portion 406a of the control velocity curve 406. The comparator 81 than causes the actual arm velocity to be as indicated by the curve portion 408c which is substantially the same as that indicated by the curve portion 406b. The actual arm velocity at the end of the access reaches zero at which time the system is in track following phase.

The curves of FIGS. IIIa, IIIb, IIIc and IIIe correspond to the curves shown in FIGS. 14a-14e of U.S. Pat. No. 3,936,876. As is apparent, at the initiation of an access operation, the control velocity curve 406 rises abruptly to its highest value 406a and then decreases gradually to its capture velocity value 406c. The actual arm velocity curve 408 increases gradually to its maximum at 408b and then decreases gradually to zero on its portion 408c. Although the curve portions 408b and 408c are shown spaced from the portions 406a and 406b for clearance of illustration, they almost match exactly for all of their lengths except at the very end of the access at which the curve portion 408c reaches zero.

Although a relatively long access of 64 tracks or more is illustrated in FIG. IIIa, shorter accesses than 64 tracks occur in substantially the same manner except that the horizontal high level of velocity indicated by curve portion 408b is not reached. For shorter track accesses, the curve portion 408a is moved toward the curve portions 408c and 408b and intersects with the latter curve portions at a velocity substantially below the velocities indicated by the curve portions 406a and 408b.

The curve of FIG. IIIb showing the voltage Ev (the position error signal between terminals 43 and 44) is substantially the same as the Ev curve of FIG. 14b of U.S. Pat. No. 3,936,876. The Seek 1 and Seek 2 signals have been combined herein, and the combined "Seek 1 & 2" signal (taking the place of the separate Seek 1 and Seek 2 signals shown in FIGS. 14c and 14d of U.S. Pat. No. 3,936,876) is shown in FIG. IIIc. The VFL signal shown in FIG. IIIe corresponds to the VFL signal shown in FIG. 14e of U.S. Pat. No. 3,936,876 and is up for a longer part of the access, particularly at the instigation of the access, than is the VFL signal shown in FIG. 14e of U.S. Pat. No. 3,936,876.

Track following phase occurs when the combined signal "Seek 1 & 2" goes to zero which occurs about one track before the end of the access. The VFL latch 200 functions as described in U.S. Pat. No. 3,936,876 to change the machine from an accessing phase to a track following phase, this being under the control of the combined signal "Seek 1 & 2". The VFL signal from latch 200 is on line 87 for this purpose.

The auxiliary filter circuit 310 shown in FIG. 1 is under the control of the output of the down counter 360, for the purpose of changing the roll off of the filter F, eight tracks from the end of the access and thus at a relatively slow velocity of the arm 18 indicated by the curves 406b and 408c in FIG. IIIa.

Referring to FIG. II, it will be observed that all of the binary output signals from the down counter 360 below the count of 8 are applied to the AND circuit 378. More particularly, for this purpose, the lines d, e, f, g and j are connected to the inverters 388, 386, 384, 382 and 380 appended to the AND circuit 378. The only ones of this series of lines not supplying an input to the AND circuit 378 are the track 1, track 2 and track 4 lines a, b and c, and the result is that the AND circuit 378 supplies a signal on its output line 391 for all counts less than 8 counts in the down counter 360. The signal on the line 391 thus indicates when the access arm 18 and its servo transducer 7 are less than 8 tracks from the target track. The signal "linear region" on line 390 is also applied to the AND circuit 378, and this signal is the signal 95 shown in FIG. 13a of U.S. Pat. No. 3,936,876 and is up for all of the linear regions of the error signal shown in FIG. 12 of this patent. This signal "linear region" is used on the AND circuit 378 so as to avoid troublesome transients on the position error signal terminals 44 and 43.

The OR circuit 392 transmits the signal from the line 391 to the line 396; and, since this signal constitutes pulses due to the "linear region" signal on line 390 applied to AND circuit 378, the latch including the OR circuit 392 and AND circuit 394 is provided so as to maintain the signal on line 396 constant whenever the arm 18 and servo transducer 7 are less than eight tracks from the target track. Once a pulse appears on line 391, a corresponding signal passes from the output of the AND circuit 394 on lead 398 to the input of the OR circuit 392 so as to set the latch including OR circuit 392 and AND circuit 394 and maintain the constant signal on line 396. A constant signal is at this time on line 402 so that the AND circuit 394 may continue to be satisfied. The constant signal on line 396 is applied through the driver 400 to the terminal 344, and this signal on terminal 344 (which may be termed a "switch filter" signal) is effective to activate the auxiliary filter circuit 310 so that the capacitors 336 and 326 may be effective to decrease the roll off of the filter F to 5KHz in lieu of 15KHz. The latch including the OR circuit 392 and AND circuit 394 is deactivated whenever a start seek pulse on line 405 is applied to inverter 404 to remove a signal on line 402. The start seek pulse occurs when the Seek 1 & 2 signal first comes up and in effect starts a seek operation. Filter circuit 310 is deactivated at this time to again switch the filter F back to a 15KHz roll off condition.

When the access arm 18 is eight tracks or less away from the target track during an access operation, the "switch filter" signal on terminal 344 increases the potential on the bases of the transistors 314 and 318 (see FIG. I). The transistor 312 acts as a zener diode providing a constant drop across it regardless of current, and the current, and the increased voltage on terminal 344 applies increased potential on the bases of transistors 314 and 318 through the resistors 356 and 358. Transistors 314 and 318 thus are turned on at this time and act as shorts between points 324 and 334 and ground 322 to effectively connect points 303 and 304 to ground 322 through capacitors 326 and 336. This effectively puts capacitors 326 and 336 in series with each other and the combination of the two capacitors in parallel with capacitor C1, since due to the manner in which the capacitor C1 is wired into the FIG. I circuit, a median point of capacitor C1 is at the potential of ground 22. The roll off of the filter F is thus changed.

Referring in particular to FIG. IV, the roll off of the filter circuit F, with the auxiliary filter circuit 310 being active and in particular with the capacitors 326 and 336 being so connected between ground 322 and points 306 and 308, is indicated by the curve portion 410b. It will be observed that the roll off starts at 5KHz and decreases 20db per decade. FIG. IV shows the comparative roll offs of the filter circuit F with and without the influence of the auxiliary filter circuit 310. The curve 410a shows the roll off beginning at 15KHz of filter F without the influence of the auxiliary filter circuit 310.

When the access arm 18 and servo transducer 7 are more than eight tracks from the target track, the signal on the terminal 344 is down; and the transistors 314 and 318 under these conditions are back biased turning them off and making them open circuits in effect to thus no longer shunt transistors 316 and 320. The resistors 328 and 338 thus in effect at this time disconnect the capacitors 326 and 336 with respect to ground 322 so that the capacitors 326 and 336 are at this time not effective. Thus, at this time the effect is the same as if the leads 302 and 301 were broken; and only the resistors R1 and R2 and capacitor C1 are effective at this time for filtering action between the demodulators 34 and 35 and the buffer circuits 41 and 42. The filter F at this time has the 15KHz roll off which is shown by the curve portion 410a in FIG. IV.

Transistors 316 and 320 are on for all of the operation of the auxiliary filter 310. The 200K resistors 328 and 338 are effective when the transistors 314 and 318 are off to provide high resistance paths to allow the capacitors 326 and 336 to charge up to equal the drops across transistors 316 and 320. The transistors 316 and 320 are used in the circuit to balance the transistors 314 and 318, the drops across transistors 314 and 316 being the same and the drops across transistors 318 and 320 being the same when the transistors 314 and 318 are on. The transistors 314, 316, 318 and 320 are matched (they may all be in one module), and this fact along with the fact that the high value resistors 328 and 338 are in the circuit 310 and the fact that transistors 316 and 320 are always on result in no voltage change at points 324 and 334 when switching occurs so as to allow switching to be on the fly with no high frequency transients being applied to the terminals 43 and 44.

The auxiliary filter circuit 310 thus results in the filter F having a lower roll off when the access arm 18 and its servo transducer 7 are close to the target track and moving at a relatively low velocity along curve portions 408c and 406b shown in FIG. IIIa in comparison with a high filter roll off when arm 18 and transducer 7 are far from the target track and moving at relatively high speeds.

The signal across the points 305 and 306 of FIG. I as is apparent from a consideration of the circuitry of U.S. Pat. No. 3,936,876 is a differential time varying signal of which the frequency is proportional to the velocity of the servo transducer 7 and the arm 18 and the rate at which the transducer 7 crosses the servo tracks 4 of U.S. Pat. No. 3,936,876 (this signal varies substantially the same as the position error signal Ev across terminals 43 and 44 and shown in FIG. IIIb and in FIG. 12 of U.S. Pat. No. 3,936,876). For the previously mentioned usage of the circuitry of U.S. Pat. No. 3,936,876 for a transducer speed of 2381 tracks per second, the maximum frequency between the points 305 and 306 was typically 2.5KHz. The roll off of the filter F was 5KHz for such early structures so the signal into the velocity detect circuit shown in FIG. 29 of U.S. Pat. No. 3,936,876 and particularly into the differentiator 165 thereof was essentially 5KHz or less. The differentiator 165 provides a velocity output which is proportional to the input signal frequency, but any frequency components greater than 5KHz were filtered out by filter F and were thus not presented to the differentiator 165. It has been found that the access arm 18, the disk 1, the transducer 7 and the suspension for the arm 18 will produce noise components over a wide frequency band, and therefore the filter F is very critical in controlling the accuracy of the output of the differentiator 165. If there are any resonances in the system in the range of 5–15KHz, they should not affect the output of the differentiator 165 when a 5KHz roll off filter is used, but this is not the case when the filter F has a roll off in the vicinity of 15KHz, which is necessary for obtaining consistently indentifiable signals across the points 43 and 44 at higher speeds of transducer 7 of about 7100 tracks per second.

For higher transducer velocities, the maximum frequency between points 305 and 306 is typically 8KHz, and the roll off of filter F should be 15KHz approximately. Any resonances in the 5–15KHz range now appear as noise at the input to the differentiator 165 and are amplified proportionally to their frequency. This does not present a problem when the arm 18 is moving fast (when the signal across points 305 and 306 is nearly 8KHz) because the signal to noise ratio is high. However, as the arm slows down in approaching the target track, the output of the differentiator 165 on velocity terminal 82 consists of true velocity signal and an error signal due to differentiating high frequency noise across terminals 43 and 44. The noise present across terminals 43 and 44, since it is of high frequency is very significant and can produce as much as 100% error in the overall velocity signal on terminal 82 at low speeds of the arm 18.

The auxiliary filter circuit 310 acting in conjunction with the filter F thus changes the roll off of the filter F depending on the velocity of the access arm 18 and the frequency of the position error signal Ev shown in FIG. IIIb and of the signal between the terminals 305 and 306. More particularly, the filter 310 is switched from its relative non-attenuating condition in which its roll off is 15KHz to its relative attenuating condition in which its roll off is 5KHz when the frequency of the position error signal Ev has decreased (with decreasing velocity of servo transducer 7 across the servo tracks) to substantially less than the 5KHz roll off frequency. If the length of access is to be eight tracks or more, it is known that the frequency between terminals 305 and 306 can exceed 5KHz, and the high roll off will be needed. In this case, the switch filter signal on terminal 344 does not exist, and the capacitors 326 and 336 are ineffective as just described. The filter roll off is then 15KHz as shown by curve 410a of FIG. IV. If the length of access is eight tracks or less, or when servo transducer 7 is within eight tracks of the target track on long seeks, the frequency of the signal across points 305 and 306 will be 5KHz or less, and in this case the switch filter signal on terminal 344 is up. Under these conditions then, the capacitors 326 and 336 are made effective as just described so as to give the 5KHz roll off shown by curve portion 410b in FIG. IV to filter out the noise signal from the true velocity signal. The overall velocity signal on terminal 82 is thus accurate for low access arm speeds while the high velocity signals on terminal 82 needed at high speeds of the access arm 18 are available using the auxiliary filter circuit 310. Also, as a result of the switchable filter circuit 310, the velocity signal on terminal 82 is consistent from file to file, and the range of access times (maximum to minimum) for all seek lengths has been reduced significantly and is also more consistent from file to file.

What is claimed:

1. Data storage apparatus comprising:
   a moveable storage medium having a number of information carrying tracks thereon,
   a transducer moveable across said tracks,
   an electrical actuator for so moving said transducer,
   circuitry connected with said transducer and providing a transducer movement responsive signal the frequency of which is proportional to the velocity at which said transducer crosses said tracks, means developing a control velocity signal for a track accessing movement of said transducer from an initial track to a target track which gradually decreases in magnitude toward the target track, velocity indicative circuitry connected with said first named circuitry and responsive to the frequency of said transducer movement responsive signal for providing a velocity signal indicative of the actual velocity of said transducer across said tracks, means for comparing said two velocity signals, control circuitry connected with said actuator and with said comparing means to cause said transducer to move at approximately the same velocity as is indicated by said control velocity signal as the transducer approaches said target track, a switchable filter in said first named circuitry having relative signal attentuating and non-attenuating switched conditions for high frequency noise signals transmitted through said first named circuitry, and control means for said switchable filter for switching said switchable filter from its said non-attenuating condition to its said attenuating condition when the frequency of said transducer movement responsive signal drops below a predetermined frequency.

2. Data storage apparatus as set forth in claim 1, said control means for said switchable filter comprising means for providing a count indication of the number of said tracks between a present position of said transducer and said target track in the track accessing movement, and means responsive to the indication of the number of tracks between the transducer and said target track for switching said filter from its said non-attenuating condition to its said attenuating condition when said transducer is spaced a predetermined number of said tracks away from said target track in approaching said target track.

3. Data storage apparatus as set forth in claim 1, means for providing track crossing pulses synchronized with said transducer movement responsive signal, said control means for said switchable filter including a down counter which has said track crossing pulses applied to it and counts down as said transducer moves toward said target track in making an access so that the count therein indicates the number of said tracks between said transducer and said target track, and means responsive to the content of said down counter for switching said filter from its said non-attenuating condition to its said attenuating condition when the content of said down counter is below a predetermined count.

4. Data storage apparatus as set forth in claim 1, said velocity indicative circuitry including a differentiator the gain of which increases with the frequency of the signal applied to the differentiator.

5. Data storage apparatus as set forth in claim 1, said velocity indicative circuitry including a differentiator the gain of which increases with the frequency of the signal applied to the differentiator, means for providing track crossing pulses synchronized with said transducer movement responsive signal, said control means for said switchable filter including a down counter which has said track crossing pulses applied to it and counts down as said transducer moves toward said target track in making an access so that the count therein indicates the number of said tracks between said transducer and said target track, and means responsive to the content of said down counter for switching said filter from its said non-attenuating condition to its said attenuating condition when the content of said down counter is below a predetermined count.

6. Data storage apparatus as set forth in claim 5, said means responsive to the content of said down counter including an AND circuit having the content of said down counter applied thereto as input signals and satisfied on the existence of a plurality of said signals from said down counter so as to switch said filter when said AND circuit is so satisfied.

7. Data storage apparatus as set forth in claim 5, said means developing a control velocity signal including a read only memory having an output and having the content of said counter applied to it and pre-programmed so as to provide on its output a digital indication of said control velocity signal, and a digital to analog converter having the output of said read only memory applied to it for providing an analog control velocity signal corresponding to the digital control velocity signal applied to it from said read only memory, said comparing means including a comparator, said velocity signal indicative of the actual velocity of said transducer being an analog signal and being applied to said comparator along with said analog control velocity signal.

8. Data storage apparatus as set forth in claim 1, said filter having a relatively high frequency roll off in its said non-attenuating condition and having a relatively low frequency roll off in its said attenuating condition and said predetermined frequency below which said control means is operable to switch said filter being below said relatively low roll off frequency.

9. Data storage apparatus as set forth in claim 1, said velocity indicative circuitry including a component the gain of which is proportional to the frequency of the signal applied to said component, said filter having a relatively high frequency roll off in its said non-attenuating condition and having a relatively low frequency roll off in its said attenuating condition and said predetermined frequency below which said control means is operable to switch said filter being below said relatively low roll off frequency.

10. Data storage apparatus as set forth in claim 9, said component having a gain proportional to frequency constituting a differentiator.

11. Data storage apparatus comprising:

a movable storage medium having a number of information carrying tracks thereon, a transducer movable across said tracks, circuitry connected with said transducer and providing a transducer movement responsive signal the frequency of which is proportional to the velocity at which said transducer crosses said tracks, velocity indicative circuitry connected with said first named circuitry and responsive to the frequency of said transducer movement responsive signal for providing a velocity signal indicative of the actual velocity of said transducer across said tracks, a switchable filter in said first named circuitry having relative signal attenuating and non-attenuating switched conditions for high frequency signals transmitted through said first named circuitry, and control means for said switchable filter for switching said switchable filter from its said non-attenuating condition to its said attenuating condition when the frequency of said transducer movement responsive signal drops below a predetermined frequency.

12. Data storage apparatus as set forth in claim 11, said filter having a relatively high frequency roll off in its said non-attenuating condition and having a relatively low frequency roll off in its said attenuating condition and said predetermined frequency at which said control means is operable to switch said filter being at or below said relatively low roll off frequency.

13. Data storage apparatus as set forth in claim 11, said velocity indicative circuitry including a component the gain of which is proportional to the frequency of the signal applied to said component, said filter having a relatively high frequency roll off in its said non-attenuating condition and having a relatively low frequency roll off in its said attenuating condition and said predetermined frequency at which said control means is operable to switch said filter being at or below said relatively low roll off frequency.

* * * * *